(12) United States Patent
Amini

(10) Patent No.: US 6,351,245 B1
(45) Date of Patent: Feb. 26, 2002

(54) USE OF PHASE CODED PERMEABILITY LENSING TO OBTAIN DIRECTIONAL INFORMATION IN ELECTRO-MAGNETIC RADIATION

(75) Inventor: Bijan K. Amini, Houston, TX (US)

(73) Assignee: EM-Tech LLC, Houston, TX (US)

( * ) Notice: Subject to any disclaimer, the term of this patent is extended or adjusted under 35 U.S.C. 154(b) by 0 days.

(21) Appl. No.: 09/734,525

(22) Filed: Dec. 11, 2000

Related U.S. Application Data (60) Provisional application No. 60/170,173, filed on Dec. 10, 1999.

(51) Int. Cl.$^7$ ................................................. H01Q 1/00
(52) U.S. Cl. ........................................ 343/787; 343/753
(58) Field of Search ............................... 343/753, 787, 343/788, 909, 754; 324/228, 230, 232, 239, 260, 339, 377

(56) References Cited

U.S. PATENT DOCUMENTS

| | | | |
|---|---|---|---|
| 3,411,111 A | * 11/1968 | Meyers | ........................ 343/787 |
| 3,574,458 A | 4/1971 | Hollis | |
| 3,617,779 A | 11/1971 | Rosenberg | |
| 3,851,236 A | 11/1974 | Dennhardt | |
| 3,995,835 A | 12/1976 | Clichy | |
| 4,679,936 A | 7/1987 | Gerharz | |
| 5,132,623 A | 7/1992 | De | |
| 5,150,446 A | 9/1992 | Penner | |
| 5,231,411 A | * 7/1993 | Harrington et al. | ......... 343/771 |
| 5,426,367 A | 6/1995 | Martin | |
| 5,633,182 A | 5/1997 | Miyawaki | |
| 5,698,977 A | 12/1997 | Simpson | |
| 5,892,460 A | 4/1999 | Jerabek | |
| 5,942,894 A | 8/1999 | Wincheski | |
| 5,969,254 A | 10/1999 | Yamaguchi | |
| 6,008,657 A | 12/1999 | Suyama | |
| 6,084,403 A | 7/2000 | Sinclair | |
| 6,097,532 A | 8/2000 | Harris | |
| 6,100,696 A | 8/2000 | Sinclair | |
| 6,163,155 A | 12/2000 | Bittar | |
| 6,285,337 B1 | * 9/2001 | West et al. | ................. 343/787 |

* cited by examiner

Primary Examiner—Tan Ho
(74) Attorney, Agent, or Firm—David McEwing; Alton W. Payne (57) ABSTRACT

The present invention relates to a method and apparatus for obtaining measurements of induced resistivity of objects from confined spaces such as within the confined space of a down-hole hydrocarbon production well. It is well known that measuring the resistivity of an object or media can provide useful information regarding the composition and the location of object or media. The present invention utilizes the principles of Magnetic Antenna™ and Magnetic Lensing™ to obtain information regarding the location and properties of the target object.

2 Claims, 8 Drawing Sheets

USE OF PHASE CODED PERMEABILITY LENSING TO OBTAIN DIRECTIONAL INFORMATION IN ELECTRO-MAGNETIC RADIATION

CROSS REFERENCE TO RELATED APPLICATIONS

This application claims the benefit of U.S. Provisional Application No. 60/170,173, entitled "The use of Phase Coded Permeability Lensing to Obtain Directional Information in Electro-Magnetic Radiation," filed Dec. 10, 1999; Utility Application Ser. No. 09/332,212, entitled "Propagation of Waves Through Materials," filed Jun. 12, 1999; Provisional Application No. 60/166,694 entitled "Through Casing Resistivity Measurement in Permanently Installed Downhole Production Environment," filed Nov. 20, 1999, and Non-provisional application Ser. No. 09/716,340 filed Nov. 20, 2000; Utility Application Ser. No. 09/672,467, "Magnetic Saturation and Magnetic Coupling," filed Nov. 20, 1999; and Utility Application Ser. No. 09/672,755, "Magnetic Lensing," filed Nov. 20, 1999.

BACKGROUND OF THE INVENTION

1. Field of Use

The present invention relates to a method and apparatus for obtaining measurements of induced resistivity of objects from confined spaces such as within the confined space of a down-hole hydrocarbon production well. It is well known that measuring the resistivity of an object or media can provide useful information regarding the composition and the location of object or media. The present invention utilizes the principles of Magnetic Antenna™ and Magnetic Lensing™ to obtain information regarding the location and properties of the target object.

2. Description of Related Art

In many applications of Inductive Resistivity Measurements (IRM), limitations of space or topography prevent the use of multiple antennas arrays. This lack of multiple antennas arrays causes the loss of directional information from received EM waves. An example of space limitations is in the down-hole environment of oil wells. IRM is used in this application for reservoir mapping or the detection of interfaces among oil, water and gas in a geologic formation. The accurate knowledge of the direction of the reflected EM wave is very important in these uses of IRM. Directionality determination must be made in both the vertical and azmuthal senses. Therefore there is a need for a device to encode the radiated EM signals in a way that yields directionality in space limited environments.

One requirement when obtaining useful or reliable Inductive Resistivity Measurements (IRM) is the ability to determinate the direction, if not the location, of the target object in which resistivity has been induced and now subject to measurement. This directionality makes it possible to determine the location of various objects in which the resistivity has been induced. A customary method of locating the source, or at least ascertaining the direction of the induced signal, is to utilize multiple antennas or signal receiving devises. Measuring the signal from multiple locations provides multiple references points for determining the location based upon conventional coordinate systems or other known methods. Determining the location or the direction of an object in which resistivity signals are induced has provided significant challenges. Prior to the present invention, the utility of IRM in such applications has been severely limited.

SUMMARY OF THE INVENTION

The present invention utilizes Magnetic Antenna and Magnetic Lensing techniques to overcome the spatial limitations that heretofore have prevented multiple measurement to be taken from separate locations. Simply stated, the method and apparatus of the present invention discloses creating phase changes in a pulsed or oscillating magnetic flux transmitted from a magnetic flux transmitter. The phase changes are created in a controlled manner by utilization of the Magnetic Lensing effect. As the transmitted oscillating magnetic flux passes through differing sections of a Magnetic Antenna, the phase of the original oscillating flux is modified into multiple phases. These multiple phases are also oriented in different directions. Accordingly, a flux from a single source and having a single phase, is altered into multiple and easily distinguishable flux signals. Further, since the multiple flux signals can be oriented in different directions by the Magnetic Lens effect, it is possible to utilize the different induced phases from one or more magnetic flux transmitter to induce responsive oscillating flux signals within the target object from one or more of known locations relative to one or more signal receiving devices. These results in multiple Induced Resistivity Measurements that can provide the location or, at a minimum, the direction of the target object from the separate signal receiving devise.

Accordingly, it is an object of the present invention to provide a method and apparatus for creating multiple and distinguishable signals from a single source and utilizing at least one such signal for locating objects having electrical conductive properties.

It is another object of the present invention to utilize one or more receiving devices to determine the location, as well as direction, of one more electrically conductive objects within a geologic formation or other media surrounding the invention.

BRIEF DESCRIPTION OF THE DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention for resistivity measurements within a confined space of a hydrocarbon production well.

The above general description and the following detailed description are merely illustrative of the subject invention, and additional modes, advantages and particulars of this invention will be readily suggest to those skilled in the art without departing from the spirit and scope of the invention.

DETAILED DESCRIPTION OF THE PREFERRED EMBODIMENTS

The invention subject of this application utilizes one or more sources for generating magnetic flux. The flux can be generated utilizing a pulsed D.C. generated magnetic flux or an oscillating magnetic flux. The magnetic flux oscillates or pulses at a controlled frequency and phase.

This flux is engaged with a material that is electrically conductive and magnetically permeable, e.g., a ferromagnetic metal. It will be appreciated that such material typically act as barriers to the transmission of electromagnetic energy or signals. These materials are termed herein as "EM Barriers" or "Barrier Materials." The present invention teaches use of Barrier Materials of differing permeability and shape to construct a Lensed Magnetic Antenna for directing or focusing oscillating magnetic flux in a controlled manner. These lens components can be arranged or configured in multiple designs in accordance with the particular application.

The lens components can be configured in a "collar type" antenna shape around a pipe or similar object as illustrated in FIGS. 1, 1A, 2 and 2A. The Lensed Magnetic Antenna 560 can be made of multiple sections of differing material or like material of differing shape, e.g., thickness. It will be appreciated that the materials of differing thickness or composition will have differing permeability and conductivity. As a result, the oscillating magnetic flux from the transmitter 390 will be both phase shifted and directed as the portions of flux signal are transmitted through differing segments of the Lensed Magnetic Antenna.

Figure 1:
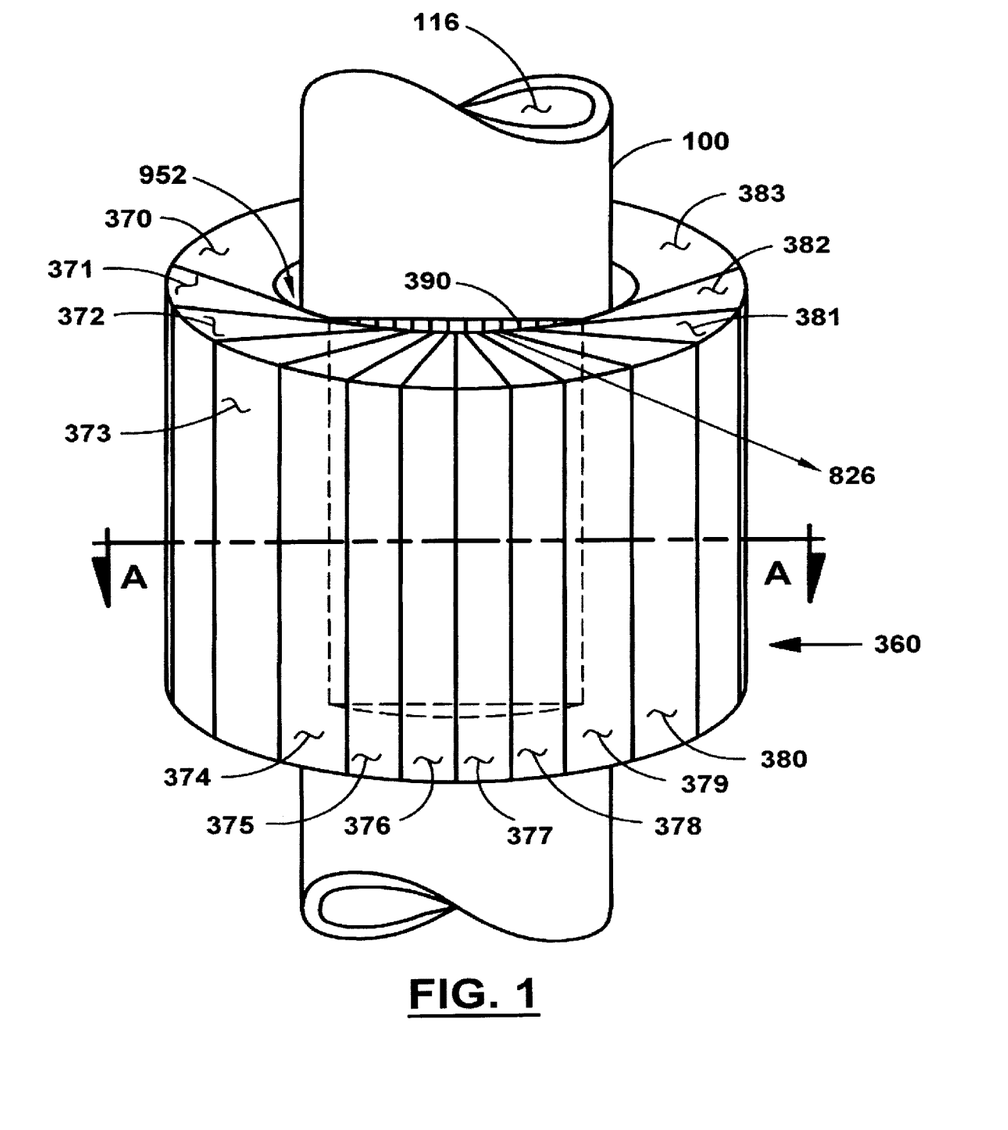
FIG. 1 illustrates a collar device attached to a production tubing comprising distinct sections having differing permeability properties.

FIG. 1 illustrates separate lens segments 370 through 383 configured into a single collar shaped Lensed Magnetic Antenna 360. Separate portions of the oscillating flux emitted from 390 are transmitted outward through separate lens segments in the manner indicated by vector 826. The power supply and other components are not shown. Means to partially saturate the permeable segments comprising the Lensed Magnetic Antenna 360 are also not shown. It may be anticipated that the means to couple with the Antenna may be required to reduce the permeability of at least some of the segments in order that the oscillating magnetic flux can couple and penetrate into the surface of the Antenna 360. This may require placement of one or more saturation coils, not shown, within the space 952 proximate to the transmitter 390.

Although it is anticipated that the well casing 100 may be an EM Barrier, embodiments of the invention may include use of non-permeable material. In this or other embodiments, it may be deemed advantageous to place the Saturation Coil inside the annulus 116 of the tube or pipe 100.

Figure 1A:
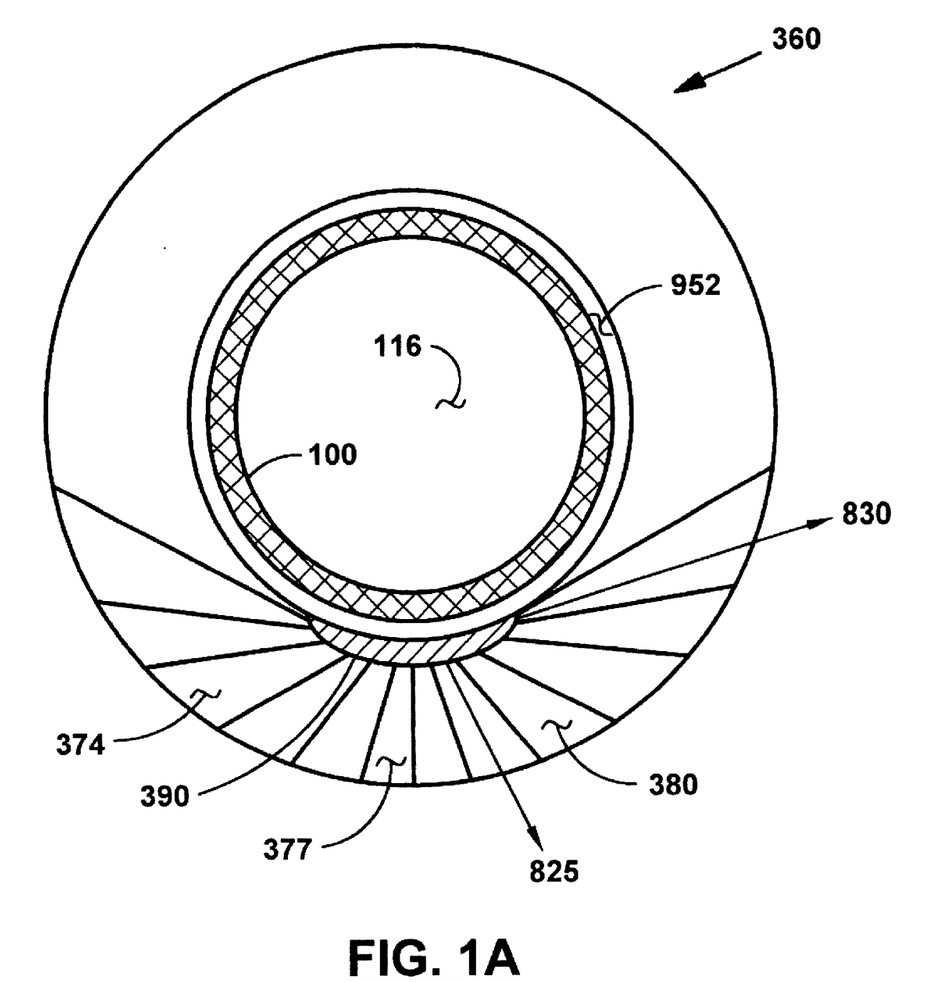
FIG. 1A illustrates a cross sectional view of the embodiment.

FIG. 1A shows the arrangement of the Lensed Magnetic Antenna 390 with the individual segments, e.g., 374, 377, etc. It will be noted that each lens segment is immediately adjacent to the transmitter 390. It will be appreciated that a small gap or spacing of a known thickness will be maintained between the transmitter 390 and the Lensed Magnetic Antenna 360.

FIG. 1 shows oscillating magnetic flux transmitted from the transmitter 390 in the same phase. Since the flux is transmitted through segments of the Antenna 360 having differing permeability or thickness, the phase of the differing portions of flux will experience differing shifts in phase. This results in phase angles Theta (1) and Theta (2). Alternatively, these lens segments could be of uniform thickness but using different materials with different permeability values located at different locations on the configuration of the Lensed Magnetic Antenna. The permeable material would be varied across the transmitter lens in a phase-coded pattern. This phase coded pattern would be related to a particular direction that would represent a signature of all the EM waves returning from a target from that direction to a separate non-lensed receiver. Since targets also can change the phase of an EM wave, the spatial relationship of the phase-coded pattern would be important in determining the returning wave direction.

It will be appreciated that a phase code pattern be utilized that will be distinctive from possible induced phase changes within the targets. It will, of course, be beneficial to have knowledge of the expected target object. For example, an advancing waterfront contact target would be changing the EM phase in a different way than stationary targets.

In one embodiment of the invention, the varying permeability creating the selected lensing of the transmitted magnetic flux may be comprised of alternating sections of the coating over the Lensed Magnetic Antenna 360. Each segment will have selected permeability variations of one (e.g., stainless steel) and ten (a semi-saturated ferromagnetic material). The resulting signals into the media would be coded at the separation angle of the lens segments and shown in FIG. 4.

Figure 2:
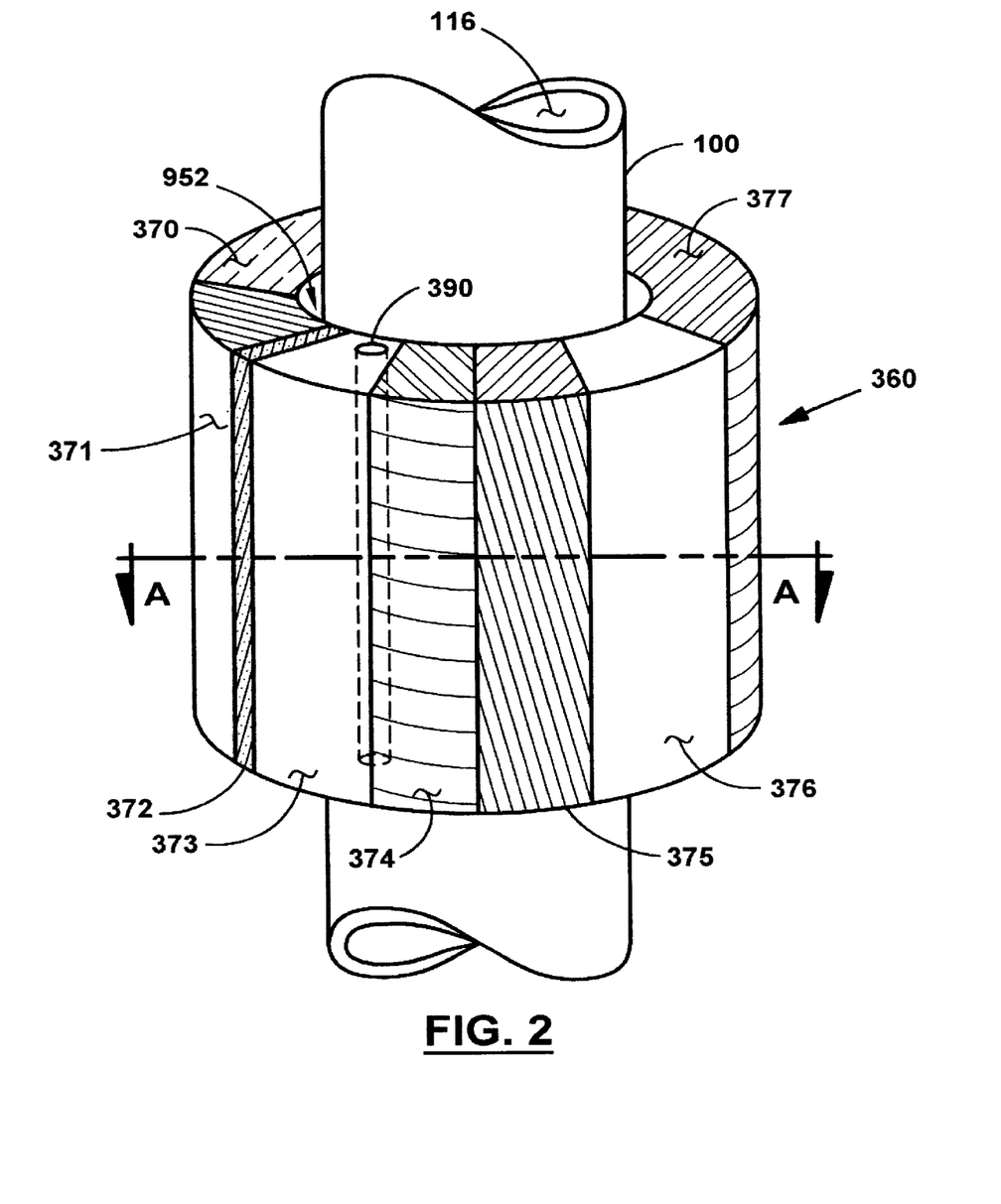
FIG. 2 illustrates another embodiment of the invention.
Figure 2A:
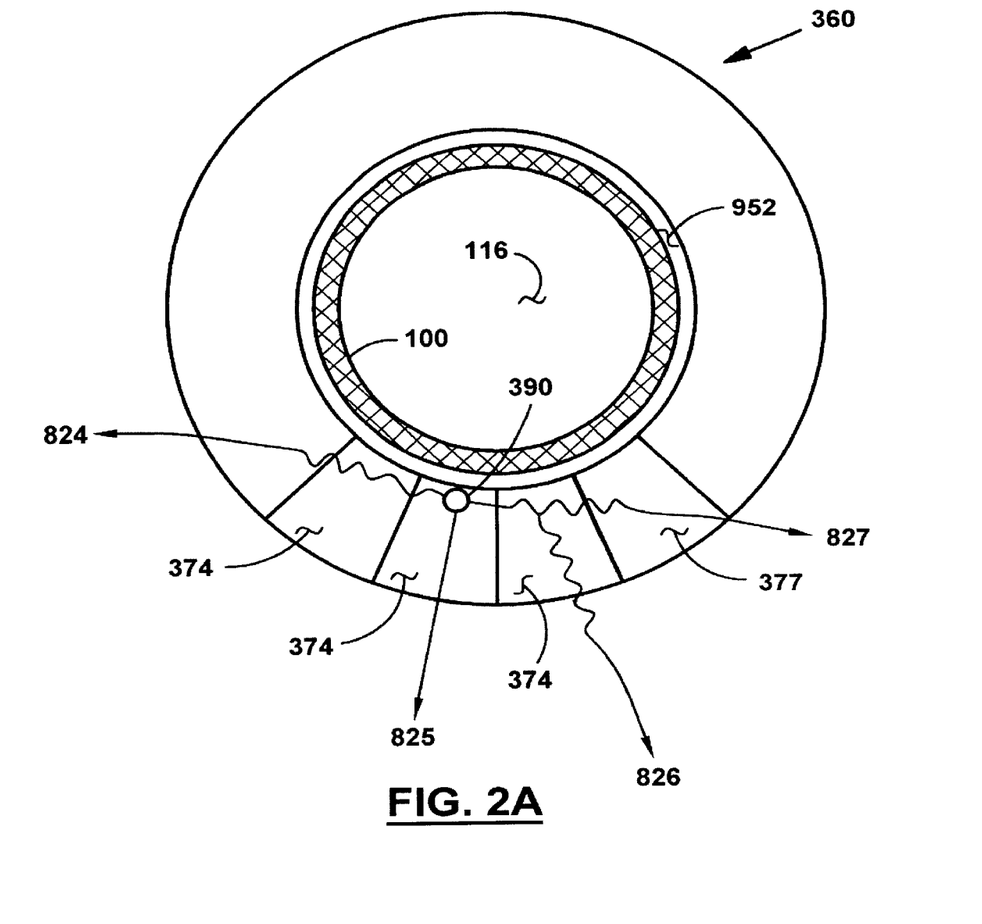
FIG. 2A illustrates a cross sectional view of the embodiment of FIG. 2.

FIG. 2 illustrates a differing configuration wherein the transmitter 390 is not adjacent to each separate lens segment of the Antenna 360. In contrast to FIGS. 1 and 1A, an oscillating magnetic flux signal from 360 may pass through several differing segments prior to being emitted from the Antenna in the altered phase and direction. It will be appreciated that FIGS. 1, 1A, 2 and 2A do not show the means for receiving a separate oscillating flux signal that may be generated from eddy currents induced from the transmitted Oscillating Magnetic Flux.

Figure 3:
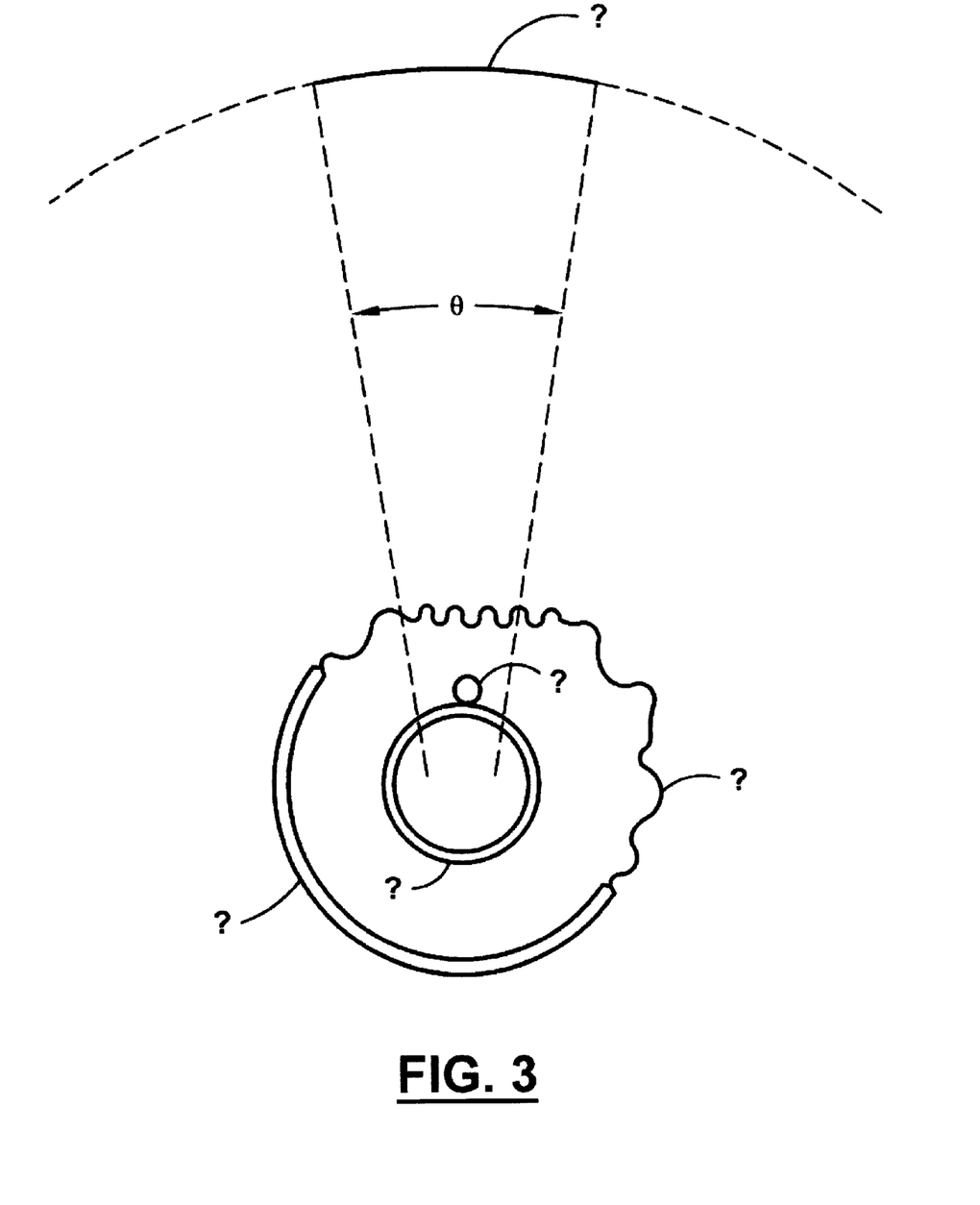
FIG. 3 illustrates the Magnetic Lensing effect achieved by transmission of an oscillating magnetic flux signal through a lens and the arc the distinctive and controlled lensed and phased signal.

FIG. 3 illustrates an arc of angle θ within which a transmitted signal may be emitted from a particular lensing segment. It will be appreciated that the arc may also overlap with the arc of at least the next adjacent lensing segments. The direction and phase provides a marker or coding as to the origin of the Oscillating Magnetic Flux. Flux that is induced through well understood electro-mechanical principles as a result of the electrically conductive object be engaged with the oscillating magnetic flux will accordingly provide information regarding the location of the object or the media that is responding to the flux transmitted by the Lensed Magnetic Antenna. The specific length and geometry of the arc will be a function of the permeability of the antenna section, the frequency of the transmitted flux and the configuration of the lensing segments comprising the Magnetic Flux Antenna.

Figure 4:
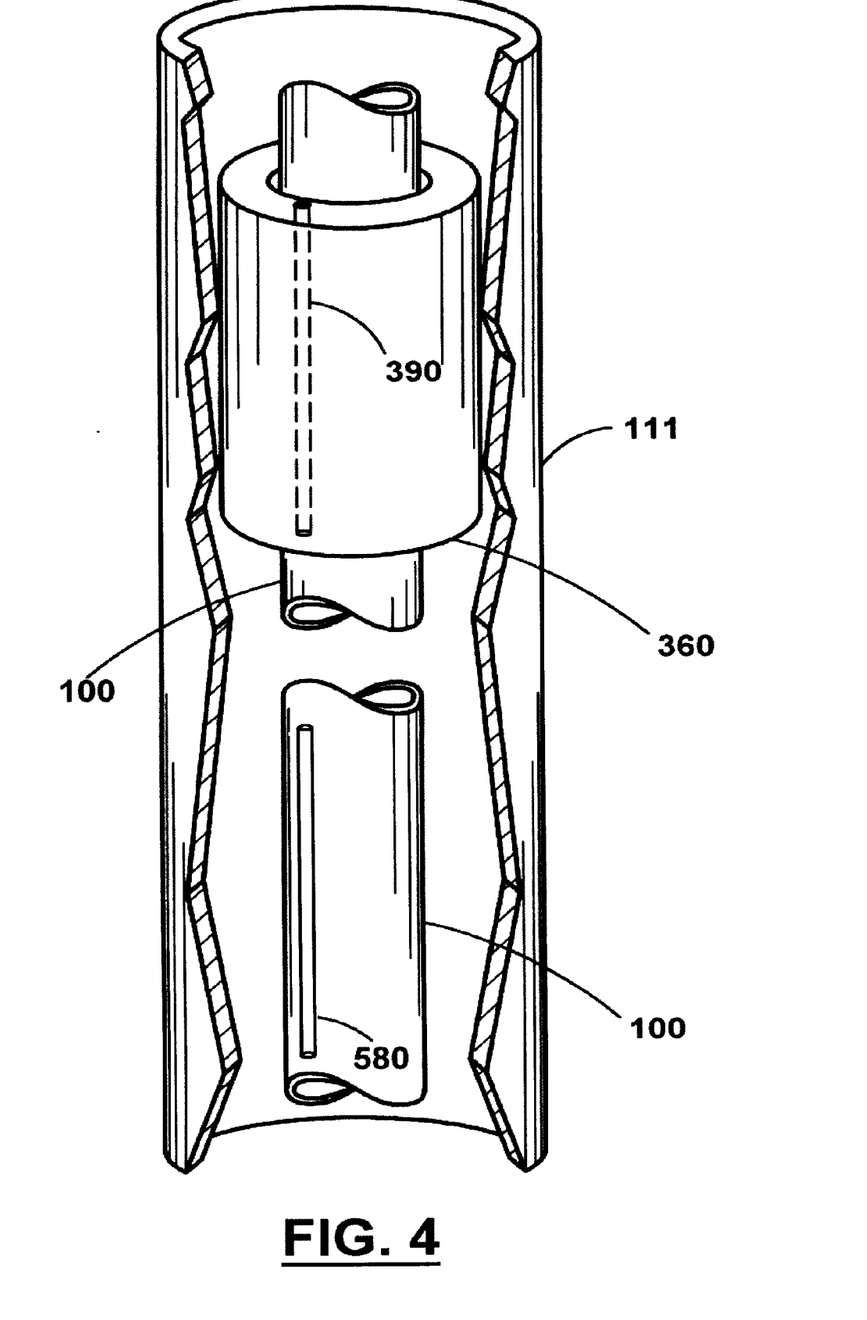
FIGS. 4 and 4A illustrates an embodiment wherein the Magnetic Lensing device is located separate from the magnetic flux receiver on a production well tubing.
Figure 4A:
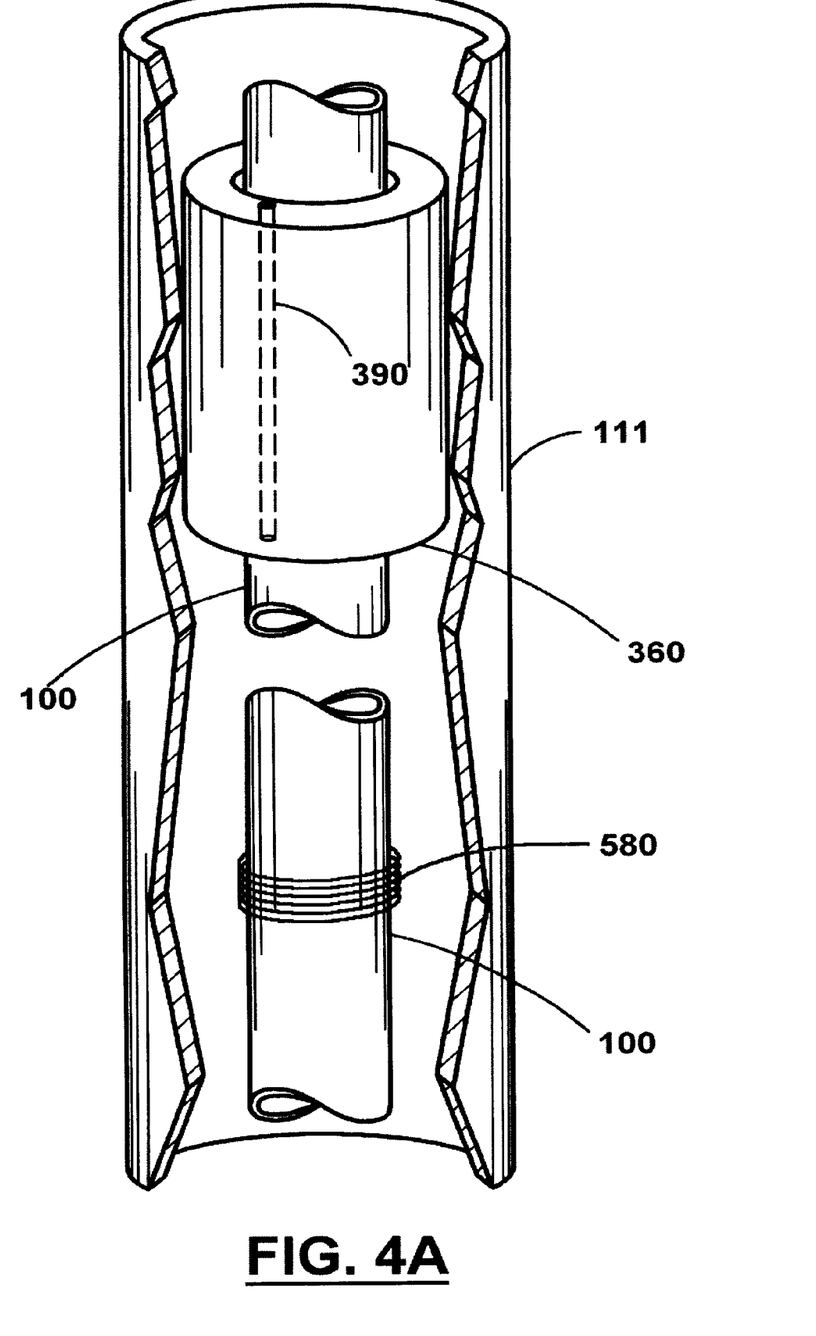
Figure 5:
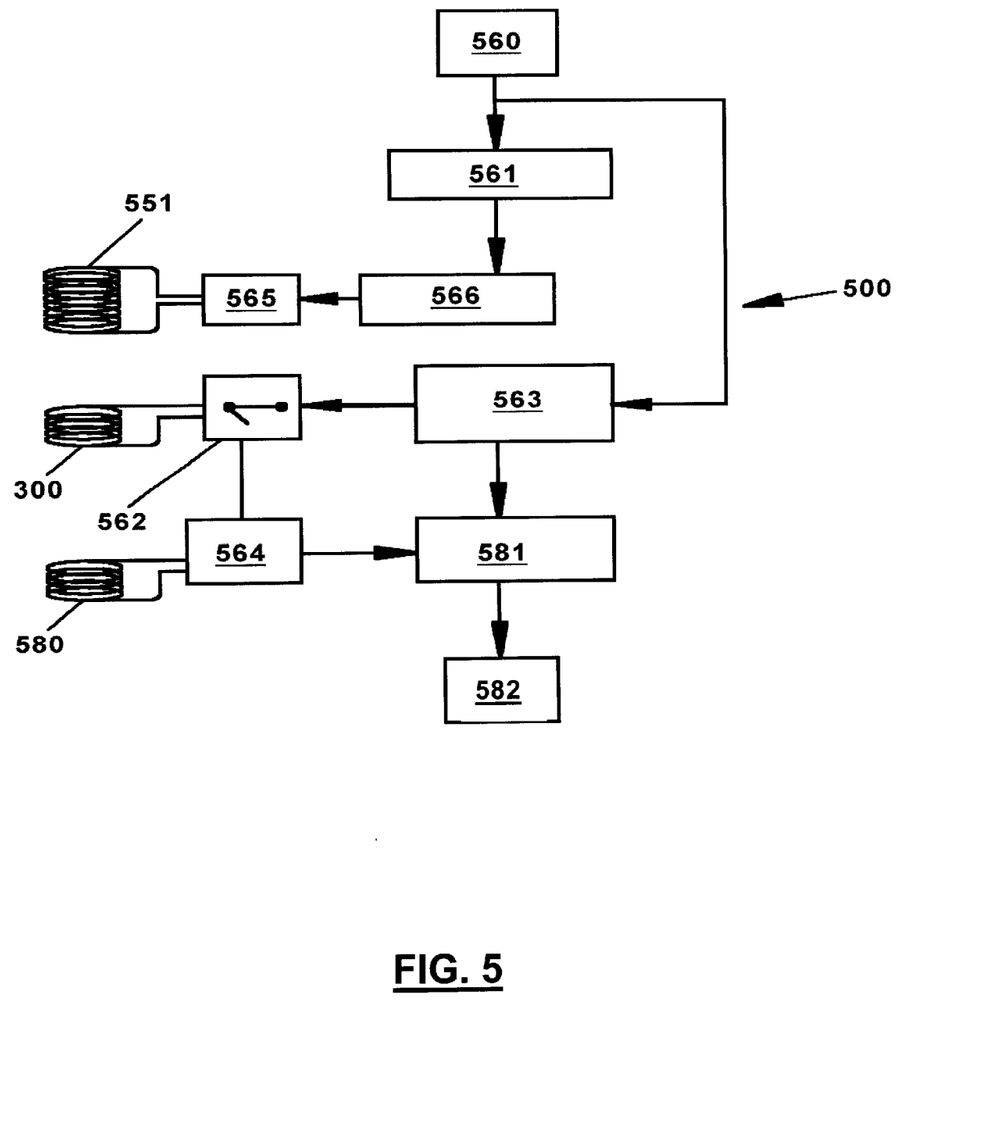
FIG. 5 is a schematic drawing of some of the components utilized in some embodiments of the invention.

FIG. 4 illustrates a configuration of the invention wherein a receiver device 580 is placed on a pipe at a location separate from the Magnetic Flux Antenna 360. The separation of the Transmitter 390 and the Receiver 580 may facilitate nulling of the direct transmission of signal. It is envisioned that the device may be used in conjunction with well casing 111 not comprising an EM Barrier, e.g., stainless steel, etc.

The lens segments may vary in thickness, causing like permeable materials to create varying phase shifting in the transmitted oscillating flux through the lens at different points by different amounts. This phase shifting occurs because the permeable material absorbs oscillating flux in proportion to the permeability value of the material and its thickness. In two dimensions, this phenomenon is shown in FIG. 4.

It will be appreciated that multiple receivers may be utilized in conjunction with one or more Phase Coded Lensed Magnetic Antenna, thereby providing multiple reference points for determining the location of target objects possessing electrically conductive properties with the area of interest. Examples can include the location of water or the water within a hydrocarbon reservoir.

As simple illustration, assume a permeable material to make up alternating sections of the coating over the transmitting antenna (as shown in FIG. 1B). The sections could have permeability variations of one (stainless steel) and ten (a semi-saturated ferromagnetic material). The resulting signals into the media would be coded at the spatial angles of the lenses as shown in FIGS. 1A, 1B.

What I claim is:

1. A method for creating a Lensed Magnetic Antenna comprising:
   a. selecting a plurality of magnetically permeable materials of which at least one of the selected materials has a differing permeability,
   b. placing the magnetically permeable materials in a determined configuration,
   c. engaging at least a portion of the configuration with an oscillating magnetic flux,
   d. transmitting at least a portion of the engaged flux through at least one of the permeable materials within the configuration,
   e. inducing eddy currents in electrically conductive material, and
   f. receiving oscillating magnetic flux generated by the induced eddy currents.

2. An apparatus for transmitting oscillating magnetic flux comprising:
   a. a plurality of magnetically permeable materials placed in a configuration and of which at least one of the magnetically permeable materials has a differing permeability,
   b. means to engage the configuration with an oscillating magnetic flux
   c. means to transmit at least a portion of the engaged flux through at least one of the permeable materials within the configuration,
   d. at least one receiver means to receive oscillating magnetic flux induced in electrically conductive material that is engaged by the transmitted oscillating magnetic flux through the configuration.

* * * * *